United States Patent
Krieg (10) Patent No.: US 7,286,895 B2
(45) Date of Patent: Oct. 23, 2007

(54) SAFETY DEVICE AND METHOD FOR DETERMINING AN OVERTRAVEL IN A MACHINE

(75) Inventor: Martin Krieg, Kirchheim/Teck (DE)

(73) Assignee: Pilz GmbH & Co. KG, Ostfildern (DE)

( * ) Notice: Subject to any disclaimer, the term of this patent is extended or adjusted under 35 U.S.C. 154(b) by 0 days.

(21) Appl. No.: 11/283,577

(22) Filed: Nov. 18, 2005

(65) Prior Publication Data

US 2006/0138310 A1    Jun. 29, 2006

(30) Foreign Application Priority Data

Nov. 24, 2004    (DE) .................... 10 2004 058 472

(51) Int. Cl.
*G06F 19/00* (2006.01)
*B23Q 16/00* (2006.01)
*F16D 71/00* (2006.01)
*F16P 3/14* (2006.01)

(52) U.S. Cl. ............... 700/177; 700/13; 700/79; 700/174; 700/206; 74/814; 192/130; 100/348

(58) Field of Classification Search .............. 700/13, 700/79–81, 174, 177, 178, 206; 74/814; 192/130; 100/348

See application file for complete search history.

(56) References Cited

U.S. PATENT DOCUMENTS

| | | | |
|---|---|---|---|
| 5,579,884 A * | 12/1996 | Appleyard et al. | 192/130 |
| 6,316,763 B1 * | 11/2001 | Appleyard et al. | 250/221 |
| 6,752,253 B2 * | 6/2004 | Fiessler | 192/130 |
| 2002/0104958 A1 | 8/2002 | Fiessler | |
| 2002/0170401 A1 | 11/2002 | Fiessler | |

FOREIGN PATENT DOCUMENTS

| | | |
|---|---|---|
| DE | 197 17 299 A1 | 2/1989 |
| DE | 200 06 587 U1 | 8/2000 |
| DE | 100 27 156 A1 | 12/2001 |
| DE | 101 23 562 A1 | 11/2002 |
| DE | 202 17 426 U1 | 2/2003 |
| DE | 103 09 399 A1 | 9/2004 |
| WO | WO 97/25568 | 7/1997 |

* cited by examiner

*Primary Examiner*—Leo Picard
*Assistant Examiner*—Sean Shechtman
(74) *Attorney, Agent, or Firm*—Harness, Dickey & Pierce, P.L.C.

(57) ABSTRACT

A safety device for a machine has a first machine part for carrying out a working movement towards a second machine part. It also has at least a first and a second optical barrier moving along with the first machine part during the working movement. The first optical barrier runs ahead of the first machine part by a first distance, and the second optical barrier is arranged at a second distance from the first optical barrier. A control unit is designed to stop the working movement of the first machine part when the first optical barrier is interrupted. A test unit allows to test whether the second optical barrier has been interrupted once the first machine part has been stopped. A blocking unit serves for blocking the working movement as a function of the test result from the test unit. Using this safety device it is possible to determine an overtravel of the first machine part in a simple and reliable manner. Furthermore, an optical sensor barrier can be used to detect the position for a switchover between a rapid motion and a creep motion of the machine without requiring additional position sensors.

20 Claims, 4 Drawing Sheets

SAFETY DEVICE AND METHOD FOR DETERMINING AN OVERTRAVEL IN A MACHINE

CROSSREFERENCES TO RELATED APPLICATIONS

This application claims priority from German patent application DE 10 2004 058 472.9 filed on Nov. 24, 2004.

BACKGROUND OF THE INVENTION

The present invention relates to a safety device for a machine, and more particularly to a safety device for a press brake, a folding bench, a stamping machine, a cutting machine or any other machine in which two machine parts are moved towards one another. However, the present invention is not restricted to these applications and can likewise be used in other machines, in which a concurrently moving protective device operating in a non-contact fashion (commonly designated as electro-sensitive protective equipment) can be used for preventing accidents.

DE 202 17 426 U1, which is assigned to the present assignee and which is incorporated here by reference, discloses a safety device, which has in total eight optical barriers running ahead of a moving machine part during its working movement. Four first optical barriers are arranged at increasing first distances in or near the plane of movement, which is defined by the leading edge as a result of the working movement. Four second optical barriers are arranged parallel to the plane of movement, but with an offset to the operator's side. Furthermore, the second optical barriers are arranged slightly higher than the first optical barriers, with the result that each first optical barrier runs ahead of a second optical barrier during the working movement. A particular aspect of this prior art safety device lies in the fact that selected first (and second) optical barriers can be deactivated permanently by means of a configuring means. It is thus very simple to adapt the known safety device to machines having different moving speeds and different overtravels ("stopping distance"). In the case of very slow machines, the overtravels are generally short, and the known safety device in this case only requires a few optical barriers, which are arranged at a smaller distance from the leading edge of the moving machine part. However, in the case of high-speed machines and also in the case of machines having only simple hydraulic drives, the barriers which are close to the leading edge are not capable of stopping the moving machine part in good time before a possible accident. In these cases, the barriers running further ahead are used, too.

In the end, the suitable configuration of the known safety device is thus dependent on the overtravel of the machine. In order to correctly configure the known safety device on a machine, it is desirable to be able to determine the current overtravel. Furthermore, it is desirable for safety reasons to check a selected configuration with regard to the overtravel. In this regard, above-mentioned DE 202 17 426 U1 mentions a program module which is stored in the control unit of the machine and which allows automated determination of the current overtravel. In practice, a CNC control unit is generally used for this purpose, with the moving machine part being moved in a test mode at its working speed and then an emergency stop being triggered via an emergency off button. The current overtravel can then be determined by the CNC control unit using the positions at the time of the emergency stop and once the machine part has come to a standstill.

The advantage of this procedure lies in the fact that the overtravel can be accurately determined by means of the CNC control unit since a CNC control unit is designed for exact position and movement control. In addition, many machines having moving machine parts nowadays have CNC controllers.

A downside of this procedure, however, is the fact that CNC control units are generally not safe as regards the relevant safety provisions, such as the European Standard EN 954-1. Since the determination of the overtravel for the known safety device is a safety-relevant measurement variable, additional measures have to be taken. Generally, additional position sensors, such as switching cams, are required which are used for safety-relevant position sensing alone.

SUMMARY OF THE INVENTION

Against this background, it is an object of the present invention to provide an alternative which allows cost-effective, convenient and safe determination of the overtravel in a machine of the above-mentioned type.

It is a further object of the present invention to provide an arrangement for detecting the position for a switchover between a rapid motion and a creep motion of the machine without requiring additional position sensors.

In accordance with one aspect of the invention, there is provided a safety device for a machine having a first machine part and a second machine part, in which the first machine part carries out a working movement towards the second machine part, wherein the first machine part has a leading edge in the direction of movement, the safety device comprising:
  at least a first and a second optical barrier adapted to move along with the first machine part during the working movement, wherein the first optical barrier is adapted to run ahead of the leading edge by a first distance, and the second optical barrier being arranged at a second distance from the first optical barrier,
  a control unit, which is configured to stop the working movement of the first machine part if the first optical barrier is interrupted,
  a test unit for testing whether the second optical barrier has been interrupted once the first machine part has been stopped, and
  a blocking unit for blocking the working movement of the first machine part as a function of a test result from the test unit.

In accordance with another aspect of the invention, there is provided a safety device for a machine having a first machine part and a second machine part, in which the first machine part carries out a working movement towards the second machine part, wherein the first machine part has a leading edge in the direction of movement, the safety device comprising
  at least a first optical safety barrier adapted to move along with the first machine part during the working movement, wherein the first optical safety barrier is adapted to run ahead of the leading edge by a first distance,
  an optical sensor barrier, which is adapted to run ahead of the first optical safety barrier, when viewed in the direction of the working movement, and
  a control unit which is configured to stop the working movement of the first machine part if the first optical safety barrier is interrupted and which is configured to reduce the moving speed of the first machine part when the optical sensor barrier is interrupted in order to move the first machine part at a reduced moving speed.

In accordance with yet another aspect of the invention, there is provided a method for determining an overtravel in a machine having a first machine part and a second machine part, in which the first machine part carries out a working movement towards the second machine part, wherein the first machine part has a leading edge in the direction of movement, the method comprising the steps of:

providing at least a first and a second optical barrier, which move along with the first machine part during the working movement, wherein the first optical barrier runs ahead of the leading edge by a defined first distance and the second optical barrier is arranged at a defined second distance from the first optical barrier, stopping the working movement of the first machine part when the first optical barrier is interrupted, after the first machine part has come to a standstill, carrying out a test to establish whether the second optical barrier is interrupted, and using the second defined distance as a threshold value for the overtravel.

According to one aspect of the present invention it is an idea to use the optical barriers of the safety device itself to determine the overtravel. Since the signal processing of the safety device per se is designed in accordance with the relevant safety provisions, and since the safety device needs to be mounted on the machine in any case, the novel approach is very cost-effective. In particular, it allows to dispense with additional safety-relevant position sensors, although such position sensors can, of course, nevertheless be used for other reasons.

A further advantage is the non-contact and thus wear-free determination of the overtravel. This reduces the complexity in terms of maintenance and operational costs of the novel safety device.

In addition, the new approach allows reliable determination of the overtravel regardless of whether or not the respective machine has a CNC controller. The new approach can therefore be used in a very advantageous manner in "small" machines, which are operated without a CNC controller, or it can be retrofitted in a simple manner on older machines without a CNC controller.

Finally, the new approach allows very safe and nevertheless convenient determination of the overtravel, since faulty operations and/or manipulations are largely ruled out. This is particularly the case when the at least two optical barriers are arranged in a rigid position in relation to one another predetermined fixedly by the manufacturer, which also represents a simplification of the installation and assembly. In particular, it is preferable for all of the receivers (or all of the transmitters on the transmitter side) of the optical barriers to be preassembled in a common housing or on a common mounting platform, with the result that only one "receiver block" (or one "transmitter block") needs to be mounted when installing the safety device.

Compared with the determination of the overtravel by means of a CNC control unit, the new approach has the downside that the overtravel can only be determined with the pitch of the (second) defined distance between the first and the second optical barriers. Precise analysis of the situation has shown, however, that this disadvantage is easily acceptable for the present application, since it is only necessary to monitor the extreme values. It is not necessary to determine the overtravel exactly when ensuring the safety of the machine. Rather, it is sufficient to ensure that the actual overtravel under no circumstances exceeds the value laid down as the basis for the configuration of the safety device. If this condition is fulfilled, the new safety device can operate reliably even if the actual overtravel does not exactly correspond to the second distance.

The new safety device and the new method thus allow a cost-effective, convenient and reliable determination of the overtravel.

According to one aspect of the present invention it is an idea to provide an optical sensor barrier, which runs ahead of the first optical safety barrier by a distance, when viewed in the direction of the working movement, with the control unit being configured to reduce the moving speed of the first machine part when the optical sensor barrier is interrupted in order to move the first machine part at a reduced moving speed.

This optical sensor barrier does not act as a "safety barrier", whose interruption causes the working movement being stopped. Rather, the optical sensor barrier is used as a sensor element for switching over from a working movement at high speed (rapid motion) to a working movement at low speed (creep motion). Switching over in this manner contributes to increasing the productivity of a machine by only the last hazardous part of the working movement being carried out at a safer, slow speed, while the machine is brought into a working position at a higher speed, from which working position the workpiece is formed, for example. Up to now, additional position sensors have been used for the switchover between rapid motion and creep motion, but said position sensors can be dispensed with in this refinement. Furthermore, the optical sensor barrier allows the determination of process variables, such as the thickness of the workpiece to be machined or the speed of the moving machine part. These process variables can advantageously be taken into consideration during the production sequence.

In a refinement of the invention, a standstill indicator is provided, which indicates when the first machine part has come to a standstill once the working movement has been stopped, preferably it automatically indicates the standstill. This standstill indicator is preferably connected to the test unit such that the test unit only checks the second optical barrier once the moving machine part has come to its final standstill.

In this refinement, the determination of the overtravel can be automated completely. As an alternative, the determination of the overtravel could also be initiated by a manual input if the operator has recognized that the moving machine part has come to a complete standstill. In addition to the increased convenience, this refinement is more reliable since erroneous inputs and instances of checking the second optical barrier "too early" are prevented.

In a further, preferred refinement of the invention, the second optical barrier is arranged closer to the leading edge than the first optical barrier, when viewed in the direction of the working movement.

In a machine in which the moving machine part carries out its working movement downwards from an upper rest position, such as in the case of a press brake, this refinement results in the second optical barrier being positioned higher than the first optical barrier. However, the refinement is not restricted to this preferred arrangement and comprises to a similar extent arrangements in which the moving machine part carries out a working movement from the bottom upwards or in any other desired direction. Furthermore, cases may also be included in which two or more machine parts are moved towards one another at the same time. In any case, this refinement has the advantage that the second machine part can be used as a reference point for the second optical barrier. In other words, the position of the first, moving machine part can be determined once it has come to a standstill (and thus after the overtravel) by a check being carried out to establish whether the second optical barrier is interrupted by the second machine part or an obstacle associated therewith. This refinement allows particularly simple and reliable determination of the overtravel using a safety device of the type described initially, in particular on a press brake or the like.

In a further refinement, the blocking unit is configured such that it blocks the working movement of the first machine part if the second optical barrier has been interrupted after the standstill.

This refinement further simplifies the determination of the over-travel. In particular, it is easily possible to make the decision whether the overtravel of the moving machine part is less than the defined second distance between the two optical barriers. As an alternative to this, however, it is also possible to make this decision in a case in which the assumed overtravel has been exceeded, if the second optical barrier has not been interrupted after the first machine part has come to a standstill by, for example, a suitable sensor array being illuminated by the second optical barrier, and the sensor array providing information regarding the position of the moving first machine part once it has come to a standstill.

In a further refinement, the control unit is configured to stop the working movement of the first machine part if the second optical barrier is interrupted.

In this refinement, the second optical barrier also acts as a "true safety barrier", i.e. it is used not only for the determination of the position of the moving machine part once it has come to a standstill. As a result, additional safety is achieved in a cost-effective manner, in particular when the second optical barrier is arranged closer to the leading edge than the first optical barrier. In this case, it is possible to detect any late intrusion into the hazardous region in a very simple and reliable manner.

In a further refinement, a plurality of first optical barriers are provided, which run ahead of the leading edge by increasing first distances, wherein it is possible to deactivate at least one first optical barrier for the duration of the working movement.

This leads to a very flexible and cost-effective safety device for machines of the type mentioned initially.

In a further refinement, an input unit is provided for entering a parameter value, which represents an overtravel of the first machine part, wherein the at least one first optical barrier is capable of being deactivated as a function of the parameter value.

This refinement combines the basic concept of the present invention with a parameter input when configuring the safety device. As an alternative to this, it would also be possible, for example, to find a suitable configuration by trial and error tests carried out for each available configuration to determine whether it allows safe disconnection of the machine taking into account the overtravel. The preferred parameter input does, however, reduce the number of necessary test runs and thus allows a quicker and more flexible configuration.

In a preferred refinement, the parameter value is input into a memory of the control unit mentioned initially. In this case, the control unit preferably is a failsafe PLC (programmable logic controller), as is marketed by the Applicant of the present invention under the brand name PSS®. This refinement has the advantage that numerous further configurations can be provided by means of the control unit. The new safety device can therefore be adapted to a specific machine in a very flexible manner. For instance, the cycle times of a machine can be minimized in this refinement, despite the safety measures required.

In an alternative refinement, the parameters are input by means of DIP switches, jumpers or other manually operable input elements. This refinement allows a very simple parameter input and is particularly well suited to safety devices which are operated without safety PLCs. In the last mentioned case, it is preferable if the input element is read each time voltage is returned to the machine again, which provides high safety with respect to intentional and unintentional manipulations.

In a further refinement, an input unit is provided for entering a delay time parameter in order to delay the reduction in the moving speed once the third optical barrier has been interrupted.

This refinement is particularly advantageous if a plurality of first optical barriers are used, of which at least a few can be permanently deactivated in a configuration process (i.e. at least for the duration of the entire working movement). The preferred refinement in this case allows to delay braking of the moving machine part once the third optical barrier has been interrupted in order to move the machine part up to the workpiece as quickly as possible. A minimum working cycle can thus be achieved independently of the selected configuration for the safety device.

In a further refinement, an input unit is provided for entering a workpiece thickness parameter and/or a moving speed parameter for the first machine part.

If at least one of the two above-mentioned parameter values is known, the respective other parameter value can be determined or checked by means of the third optical barrier. For example, the thickness of a workpiece to be machined can be determined by means of the third optical barrier when the moving speed of the moving machine part is known. On the other hand, the speed of the moving machine part can be determined when the workpiece thickness is known. The preferred refinement thus makes available, in a very cost-effective manner, process parameters which can be used to optimize the production sequence. Furthermore, the operational reliability can be further increased in this refinement by recognizing, for example, workpieces whose material thickness exceeds a predefined threshold value, and these workpieces can be excluded from machining. On the other hand, the moving speed of the first machine part can be controlled in a very simple and safety-relevant manner by means of a standardized test workpiece of known thickness.

In a further refinement, the third distance is in the range from approximately 5 mm to approximately 20 mm.

This parameter range for the third distance has proved particularly advantageous at least for applications in press brakes today.

In a further refinement, the optical barriers comprise at least one receiver part, and the test unit and the blocking unit are integrated in the receiver part.

This refinement allows to use the new safety device irrespective of the presence of a safety PLC and/or a CNC controller. Even older and/or small machines, which do not have the abovementioned controllers, can be retrofitted in a very simple and cost-effective manner.

It goes without saying that the above-mentioned features and those to be explained below can be used not only in the given combinations but also in other combinations or on their own, without departing from the scope of the present invention.

BRIEF DESCRIPTION OF THE FIGURES

Exemplary embodiments of the invention are illustrated in the drawing and will be explained in more detail in the description below. In the drawing.

DESCRIPTION OF PREFERRED EMBODIMENTS

Figure 1:
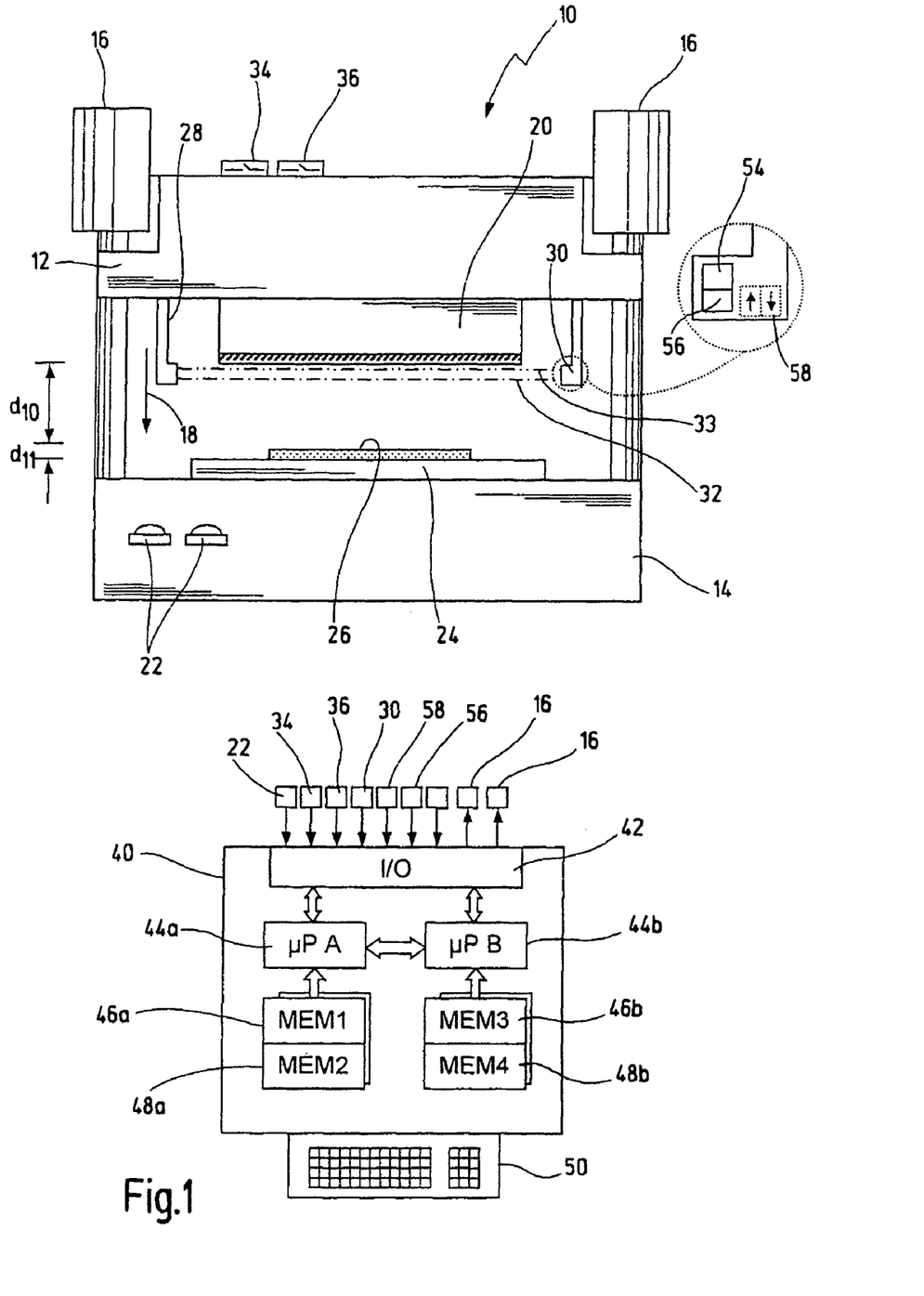
FIG. 1 shows a simplified illustration of a press brake comprising the new safety device.

In FIG. 1, a press brake, which is a preferred machine for the new safety device, is overall given the reference numeral 10. However, it will be appreciated that the present invention can be used not only in press brakes but also in other machines, in which two machine parts carry out a working movement against each other.

The press brake 10 has an upper tool 12 and a lower tool 14. The upper tool 12 is typically the moving, first machine part in terms of the present invention, and the lower tool 14 is the second machine part. Reference numerals 16 in a simplified manner indicate two drives, by means of which the upper tool 12 can be moved towards the lower tool 14 in the direction of an arrow 18. A male die 20 is arranged on the upper tool 12. Reference numeral 22 designates a simplified illustration of a two-handed switch, which has to be actuated using two hands in order to start and carry out a working cycle of the press brake 10. As an alternative to this, the press brake 10 may also be operated using a suitable foot pedal or other actuating elements.

A female die 24 is arranged on the lower tool 14, and a workpiece 26, for example a sheet metal part, rests on said female die 24. The lower end of the male die 20 is designed to be complementary with the female die 24 and makes possible non-cutting deformation of the workpiece 26 when it is inserted into the female die 24 (cf. FIG. 2).

Reference numerals 28 and 30 indicate two holders, which are arranged on the left-hand and right-hand side of the male die 20 on the upper tool 12. A transmitter (not illustrated separately here) is located at the end of the holder 28, and two or more receivers (not illustrated separately) are located at the end of the holder 30. The transmitter and receivers form a light barrier arrangement, which produces two or more light beams 32, 33. Light beams 32, 33 represent a first and a second optical barrier in terms of the present invention. They extend approximately parallel to the lower edge of the male die 20, as will be explained in more detail below with reference to FIG. 2. As an alternative to the use of "conventional" light barriers, the optical barriers 32, 33 may also be realized by means of a camera or with other electromagnetic beams. All what matters is that at least one barrier, which is not of a material nature and which acts as the first barrier in terms of the present invention, runs ahead of the lower leading edge of the male die 20.

The optical barriers 32, 33 move downwards with the male die 20 in the direction of the arrow 18.

At reference numerals 34 and 36, two end switches are illustrated schematically which are only closed when the upper tool 12 is located in its upper dead position. The closed position of the end switches 34, 36 thus indicates that the press brake 10 is located in its initial state for carrying out a working cycle.

At reference numeral 40, a control unit is illustrated in simplified form which controls at least some of the functions of the press brake 10. In a preferred exemplary embodiment, the control unit is a failsafe PLC, as is marketed by the present Applicant under the brand name PSS®. The control unit 40 comprises (illustrated in simplified form) an interface part 42 and two or more redundant signal processing channels. The signal processing channels are each illustrated here by a processor 44a, 44b, a first memory 46a, 46b and a second memory 48a, 48b. Further memories are indicated symbolically. The processors 44a, 44b can communicate with one another via a suitable interface, for example a bus connection or a dual-ported RAM, and thus carry out a plausibility check on the respective processing results. The interface part 42 has a plurality of inputs and outputs, to which the sensors and actuators of the press brake 10 are connected. In particular, the two-handed switch 22, the end switches 34, 36 and at least the receiver 30 of the light barrier arrangement are connected here. Furthermore, the drives 16 of the press brake can be disconnected via suitable actuators, such as contactors (not illustrated here).

In the exemplary embodiment shown, the receiver 30 comprises a test unit 54 and a blocking unit 56, which are only illustrated schematically here. They are both functionalities which are either stored as a program module for a microcontroller (not illustrated here) of the receiver 30, or are realized in the form of permanently wired logic, for example in the form of an ASIC. As an alternative to this, the functionality of the test unit and the blocking unit may also be implemented in the control unit 40, for example as a program module, which is stored in the memories 46, 48 in a redundant form. In a further exemplary embodiment, the function of the control unit is partially or completely integrated in the receiver 30, for example as a program module and/or as permanently wired logic. The latter implementation has the advantage that the novel safety device is autonomous from other control units, which may be provided on the monitored machine.

Reference numeral 58 schematically indicates two acceleration sensors, which are also integrated in the receiver 30 in one exemplary embodiment of the safety device.

As an alternative or in addition to this, one or more acceleration sensors may be arranged at another point on the moving upper tool 12. It is possible by means of the acceleration sensors 58 to determine the current moving speed and, derived therefrom, the current position of the upper tool 12 during a working cycle, as is described in another patent application of the present Applicant. Instead of acceleration sensors, the position and speed of the upper tool 12 may also be sensed, however, in a manner known per se by means of glass scales, encoder discs, separate position sensors etc. One example of a conventional speed and position sensing method in a press brake 10 is disclosed in WO 97/25568 incorporated here by reference. The integration of the acceleration sensors 58 in the receiver 30 and the determination of the movement parameters of the upper tool 12 by means of these acceleration sensors allows, in conjunction with the present invention, a particularly simple, compact and thus cost-effective safety device for a press brake.

As regards the present invention, the acceleration sensors 58 can be used in a very advantageous manner as a standstill indicator, which indicates that the upper tool 12 has come to a standstill. As an alternative or in addition to this, however, a control or state signal from the drives 16 may also be used as a standstill indicator, or a signal which is derived from a conventional position monitoring method, such as in WO 97/25568. Furthermore, it is basically possible to start determination of the over-travel manually following a corresponding input by the operator.

Figure 2:
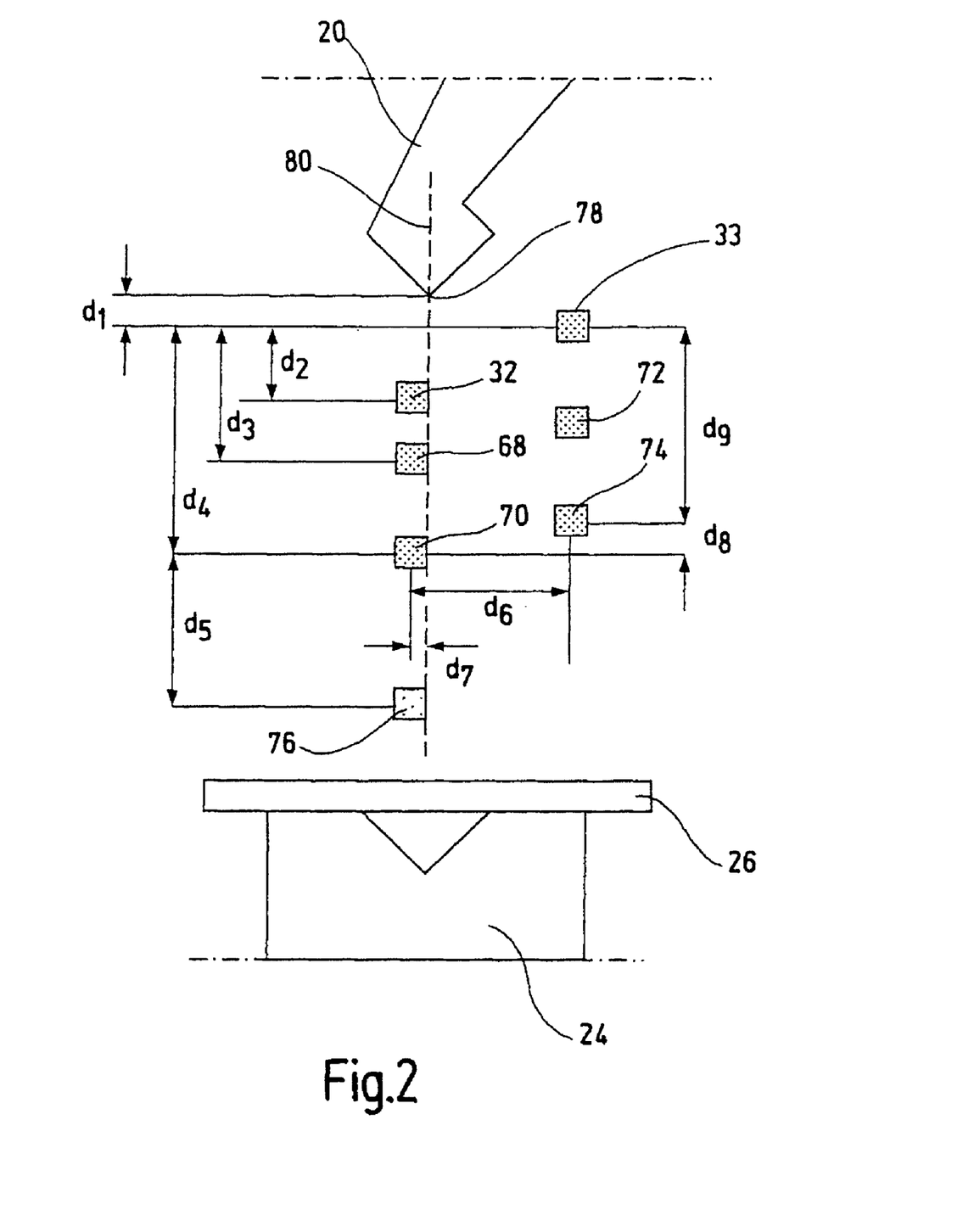
FIG. 2 shows a schematic illustration of an exemplary embodiment of the optical barriers in the press brake shown in FIG. 1.

In the description below relating to a preferred exemplary embodiment of the optical barriers of the new safety device, same reference numerals denote the same elements as before. As shown in FIG. 2, the preferred safety device has in total seven optical barriers, namely the two optical barriers 32, 33 already shown in FIG. 1 and five further barriers, which are denoted by reference numerals 68, 70, 72, 74 and 76. The optical barriers each extend parallel to the front, leading edge 78 of the male die 20. The optical barriers 32, 68 and 70 are arranged below the male die 20 at increasing distances from the front edge 78. These barriers thus span a monitoring plane, which lies parallel to the plane of movement 80 and which is slightly offset to the left with respect to said plane of movement 80 (in the exemplary embodiment illustrated this is the rear side of the press brake 10 which is remote from the operator). The offset in this exemplary embodiment is $d_7=1$ mm. As an alternative to this, the optical barriers 32, 68, 70, 76 could, however, be arranged exactly on the plane of movement 80 or on the operator side thereof.

The optical barriers 33, 72 and 74 are arranged offset from the plane of movement 80 with respect to the operator side. To some degree, they form a light array, which is arranged slightly higher than the light array formed by optical barriers 32, 68 and 70. In a preferred exemplary embodiment, the distances between the individual optical barriers which are illustrated in FIG. 2 are selected as follows: $d_1=5$ mm, $d_2=9$ mm, $d_3=12$ mm, $d_4=17$ mm, $d_5=13$ mm, $d_6=20$ mm, $d_7=1$ mm, $d_8=2$ mm and $d_9=15$ mm.

In this exemplary embodiment, optical barrier 76 does not act as a "safety barrier" but as a sensor barrier (third optical barrier in terms of the present invention). An interruption of optical barrier 76 therefore does not result in the upper tool 12 being stopped. Rather, only the moving speed of the upper tool 12 is reduced from a high speed (rapid motion) to a low speed (creep motion) when optical barrier 76 is interrupted. In FIG. 1, the distance travelled by the upper tool 12 in rapid motion is denoted by $d_{10}$. The remaining distance travelled by upper tool 12 in creep motion is denoted by $d_{11}$.

In contrast to this, the remaining six barriers 32, 68, 70, 72, 74, 33 act as safety barriers, the working movement of the upper tool 12 being stopped immediately when these safety barriers are interrupted. In the preferred embodiment, the barriers 68, 70, 72, 74 lying further below can be permanently deactivated as a function of the overtravel of the press brake 10. (Note: This is not a short-term deactivation of the barriers for that part of the working movement which is covered by the upper tool 12 in creep motion. Such a short-term deactivation, which is typically referred to as muting, is necessary irrespective of the present configuration in order that the upper tool 12 can complete its working movement even if the optical barriers are interrupted by the work-piece 26.) Further, "can be deactivated" here means that the safety function of the barriers 32, 68, 70, 72, 74, 33 is eliminated. However, it is advantageous if the barriers 32, 68, 70, 72, 74, 33 are used even in the "deactivated" mode, namely as sensor barriers. For example, the speed of the upper tool can be determined and/or checked in a simple manner using the known distance between the "deactivated" barriers. A moving speed determined in this manner of the moving machine part (in this case the upper tool) can then be used, for example, to check the plausibility of the signal of the sensor barrier 76. It is thus possible to monitor whether the switchover from rapid motion to creep motion has been triggered by the workpiece or possibly by another obstacle, such as the hand of an operator.

Figure 4:
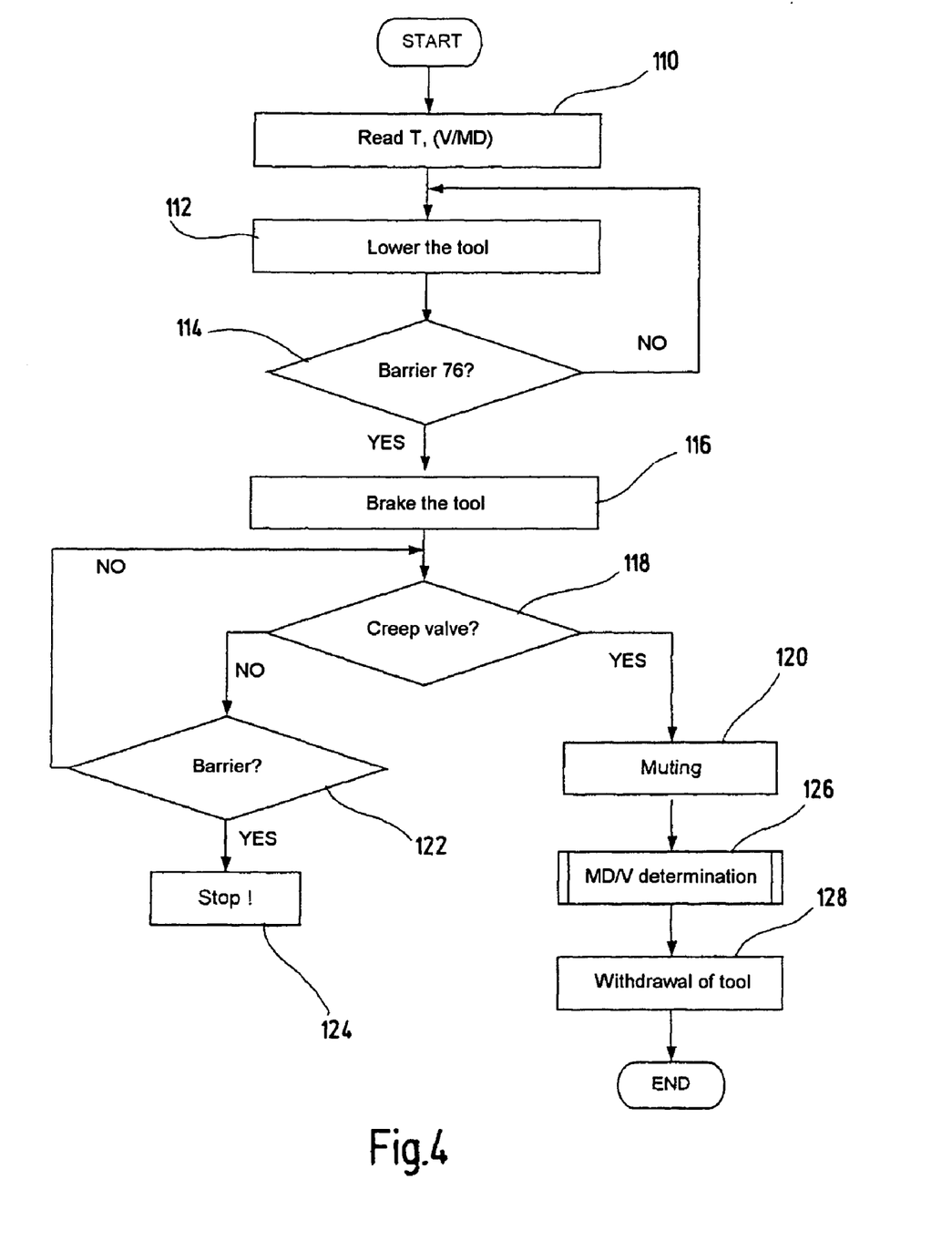
FIG. 4 shows a simplified flowchart for explaining a working cycle of the press brake shown in FIG. 1 in a preferred exemplary embodiment of the invention.

On the other hand, the sensor barrier 76 may also have a safety function, for example by determining the thickness of the workpiece to be machined by means of the sensor barrier 76 (cf. FIG. 4, reference numeral 126). If, in the process, a value is established which is too high or too low, a safety shutdown may be triggered.

Figure 3:
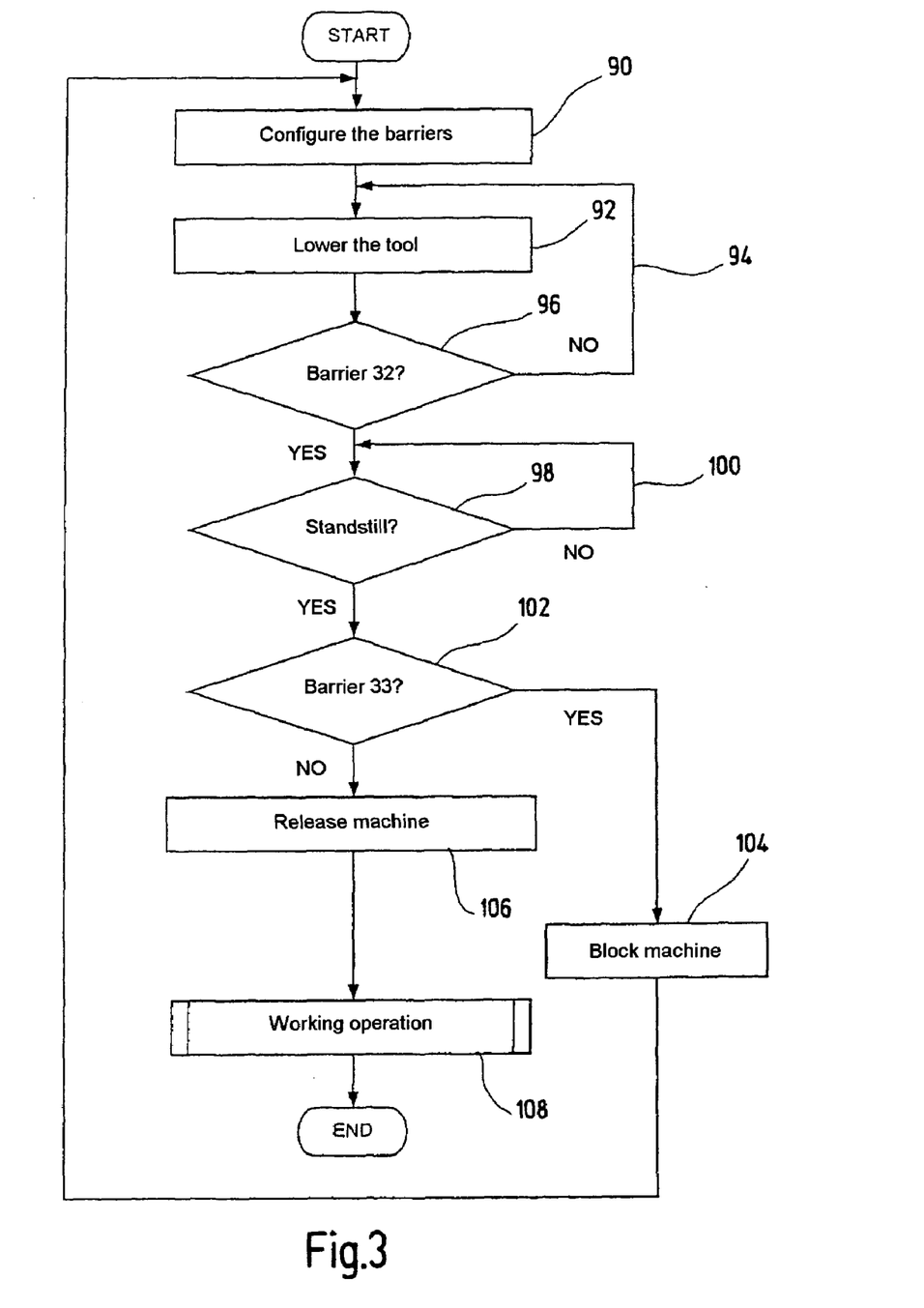
FIG. 3 shows a simplified flowchart for explaining the method for determining the overtravel in accordance with an exemplary embodiment of the invention.

A preferred exemplary embodiment for the manner in which the overtravel of the press brake 10 can be determined using the safety device shown in FIG. 2 is illustrated in FIG. 3. The method begins in step 90 with the optical barriers 32, 33, 68, 70, 72, 74 being configured by inputting an assumed overtravel into the control unit 40 of the press brake 10 by means of input unit 50. For example, if an assumed overtravel of 7.5 mm is used, at the distances illustrated the optical barriers 32 and 33 of FIG. 2 are sufficient for making the press brake 10 safe at the distances indicated. This mode of operation is illustrated by way of example in FIG. 1 as well. In order to ensure that the press brake 10 is made sufficiently safe even using only these two optical barriers, the overtravel is then determined. For this purpose, the upper tool 12 is lowered in a configuration mode (step 92), preferably in rapid motion. In this configuration mode, the barrier 76 is preferably deactivated such that the upper tool is moved to an emergency stop from rapid motion. The lowering takes place until the optical barrier 32 is interrupted by an obstacle, for example a test workpiece (loop 94, step 96). As soon as barrier 32 has been interrupted, the upper tool 12 is stopped. Owing to response times and inertial forces, the tool does not come to a standstill directly, but with a certain delay. Only after this delay does the upper tool 12 come to a standstill, which is checked in accordance with step 98 or loop 100. As soon as a complete standstill has been detected, a check is made in accordance with step 102 to determine whether the second optical barrier 33 has been interrupted by the test work-piece or the second machine part. If this is the case, the machine is blocked in accordance with step 104 since the assumed overtravel was obviously too short. In order to make the press sufficiently safe, further optical barriers, for example the barriers 68 and 72, therefore have to be added, with the result that stopping of the upper tool 12 is triggered earlier. If, on the other hand, it has been established in step 102 that the optical barrier 33 has not been interrupted, the machine is released in accordance with step 106. It is then possible to start the working operation in accordance with step 108.

FIG. 4 shows an exemplary embodiment for carrying out this working operation. In accordance with step 110, a delay time parameter T and optionally the assumed speed v of the upper tool 12 and/or the assumed material thickness MD of the workpiece 26 are initially entered into the control unit 40 by means of input unit 50. After this parameterization, the tool 12 is lowered in accordance with step 112 until optical barrier 76 is interrupted (step 114). As soon as optical barrier 76 is interrupted, upper tool 12 is slowed down (step 116) and is only moved again in creep motion.

The switchover from rapid motion to creep motion is checked (step 118) using the so-called creep valve (not illustrated here). This valve responds if the upper tool is moved at a reduced speed. Missing activation of the creep valve indicates that the upper tool 12 is continuing to move at its rapid speed.

If the activation of the creep valve has been detected, a short-term deactivation of the safety barriers takes place ("muting") in accordance with step 120. If no activation of the creep valve has been detected, the safety barriers are monitored in accordance with step 122. If one of the barriers responds owing to a lack of muting, an emergency stop is triggered in accordance with step 124. In the case of muting in step 120, on the other hand, there is no interruption of the working movement, i.e. the upper tool 12 enters the female die 24, as a result of which the workpiece 26 is deformed in the desired manner.

In accordance with step 126, the material thickness parameter MD of the workpiece 26 or the moving speed parameter v of the upper tool 12 can be determined or checked by means of the sensor barrier 76 and by means of the parameter values MD and/or v entered before. It is thus possible, for example, to calculate the material thickness of the workpiece 26 when the moving speed of the upper tool is known from the time during which the sensor barrier 76 is interrupted. On the other hand, when the material thickness is known, the speed of the upper tool can be determined. It goes without saying that both reading of the above-mentioned parameter values and the determination in accordance with step 126 are optional and can also be dispensed with.

In accordance with step 128, the upper tool 12 returns back to its initial, upper position once its lower dead position has been reached. From this initial position, the next working cycle can be started.

In a preferred exemplary embodiment, the switchover from rapid motion to creep motion also takes place once the measurement barrier 76 has been passed through as a function of the delay time T input in step 110. If T=0 is selected, the press brake 10 immediately switches into creep motion when the sensor barrier 76 is interrupted. In the case of a parameter value T>0, the switchover only takes place with a corresponding time delay. As a result, the actual switchover time can be varied, while it is possible to select the delay time to be longer the greater the distance between the sensor barrier 76 and the lowermost active safety barrier 32, 68, 70 is. In the case of a press brake having a large overtravel, in which preferably all of the barriers are active, the delay time T=0 is selected. If, on the other hand, the safety barriers 70, 74 are deactivated, a delay time T>0 is set. If only the safety barriers 32, 33 are active, an even higher delay time parameter T is set in order to operate the upper tool 12 as long as possible at the high speed of rapid motion.

In accordance with a further exemplary embodiment of the invention, the stacked arrangement of the safety barriers 32, 33, 68, 70, 72, 74 may also be used for monitoring and/or establishing the direction of movement of the upper tool. For this purpose, it is only necessary to evaluate the sequence in which the above-mentioned barriers are interrupted.

What is claimed is:

1. A safety device for a machine having a first machine part and a second machine part, in which the first machine part carries out a working movement towards the second machine part, wherein the first machine part has a leading edge in the direction of movement, the safety device comprising:

at least a first and a second optical barrier adapted to move along with the first machine part during the working movement, wherein the first optical barrier is adapted to run ahead of the leading edge by a first distance, and the second optical barrier being arranged at a second distance from the first optical barrier, a control unit, which is configured to stop the working movement of the first machine part if the first optical barrier is interrupted, a test unit for testing whether the second optical barrier has been interrupted once the first machine part has come to a standstill, and a blocking unit for blocking the working movement of the first machine part as a function of a test result from the test unit.

2. The safety device of claim 1, further comprising a standstill indicator for indicating a standstill of the first machine part after the working movement has been stopped.

3. The safety device of claim 1, wherein the second optical barrier is arranged closer to the leading edge than the first optical barrier, when viewed in the direction of the working movement.

4. The safety device of claim 1, wherein the blocking unit is configured to block the working movement of the first machine part if the second optical barrier is interrupted after a standstill.

5. The safety device of claim 1, wherein the control unit is further configured to stop the working movement of the first machine part if the second optical barrier is interrupted.

6. The safety device of claim 1, comprising a plurality of first optical barriers running ahead of the leading edge with increasing first distances, wherein at least one first optical barrier is capable of being deactivated for the duration of the working movement.

7. The safety device of claim 6, further comprising an input unit for entering a parameter value, which represents an overtravel of the first machine part, wherein the at least one first optical barrier is capable of being deactivated as a function of the parameter value.

8. The safety device of claim 1, further comprising a third optical barrier adapted to run ahead of the first optical barrier by a third distance, when viewed in the direction of the working movement, the control unit being configured to reduce a moving speed of the first machine part when the third optical barrier is interrupted in order to move the first machine part at a reduced moving speed.

9. The safety device of claim 8, further comprising an input unit for entering a delay time parameter in order to delay the reduction of the moving speed after the third optical barrier has been interrupted.

10. The safety device of claim 8, further comprising an input unit for entering a moving speed parameter for the first machine part in order to determine a workpiece thickness parameter using the third optical barrier.

11. The safety device of claim 8, wherein the third distance is in a range from 5 mm to 20 mm.

12. The safety device of claim 8, further comprising an input unit for entering a workpiece thickness parameter in order to determine a moving speed parameter for the first machine part using the third optical barrier.

13. The safety device of claim 1, wherein the optical barriers comprise at least one receiver part, and the test unit and the blocking unit are integrated in the receiver part.

14. A safety device for a machine having a first machine part and a second machine part, in which the first machine part carries out a working movement towards the second machine part, wherein the first machine part has a leading edge in the direction of movement, the safety device comprising:

at least a first optical safety barrier adapted to move along with the first machine part during the working movement, wherein the first optical safety barrier is adapted to run ahead of the leading edge by a first distance,
an optical sensor barrier, which is adapted to run ahead of the first optical safety barrier, when viewed in the direction of the working movement, and
a control unit which is configured to stop the working movement of the first machine part if the first optical safety barrier is interrupted and which is configured to reduce the moving speed of the first machine part when the optical sensor barrier is interrupted in order to move the first machine part at a reduced moving speed.

15. The safety device of claim 14, further comprising an input unit for entering a delay time parameter in order to delay the reduction of the moving speed after the optical sensor barrier has been interrupted.

16. The safety device of claim 14, further comprising an input unit for entering a moving speed parameter for the first machine part in order to determine workpiece thickness parameter using the optical sensor barrier.

17. The safety device of claim 14, wherein the distance by which the optical sensor barrier runs ahead of the first optical safety barrier is in the range from 5 mm to 20 mm.

18. The safety device of claim 14, further comprising
a second optical safety barrier, which is arranged at a second distance from the first optical safety barrier and moves along with the first machine part during the working movement,
a test unit for testing whether the second optical safety barrier has been interrupted once the first machine part has come to a standstill, and
a blocking unit for blocking the working movement of the first machine part as a function of a test result from the test unit.

19. The safety device of claim 14, further comprising an input unit for entering a workpiece thickness parameter in order to determine a moving speed parameter for the first machine part using the optical sensor barrier.

20. A method for determining an overtravel in a machine having a first machine part and a second machine part, in which the first machine part carries out a working movement towards the second machine part, wherein the first machine part has a leading edge in the direction of movement, the method comprising the steps of:
providing at least a first and a second optical barrier, which move along with the first machine part during the working movement, wherein the first optical barrier runs ahead of the leading edge by a defined first distance and the second optical barrier is arranged at a defined second distance from the first optical barrier
stopping the working movement of the first machine part when the first optical barrier is interrupted,
after the first machine part has come to a standstill, carrying out a test to establish whether the second optical barrier is interrupted, and
using the second defined distance as a threshold value for the overtravel.

* * * * *